INVENTORS
JEAN SYLVAIN BOURDIN
PIERRE ERNEST MAYET

BY Young + Thompson
ATTYS.

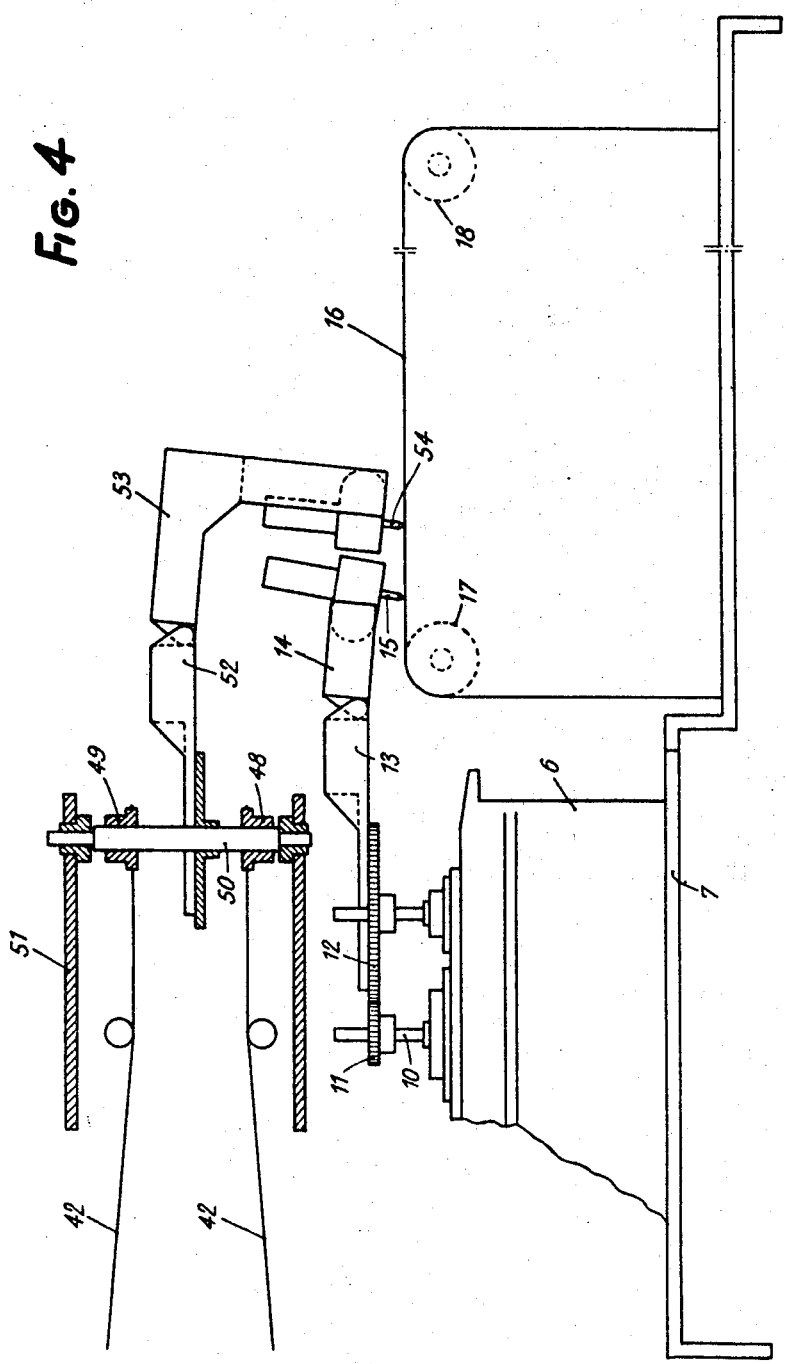

United States Patent Office 3,444,727
Patented May 20, 1969

3,444,727
METHOD AND APPARATUS FOR DETERMINING THE COMPACTNESS OF THE SURFACE OVER WHICH A VEHICLE TRAVELS
Jean Sylvain Bourdin, Nantes, Loire (Atlantique), and Pierre Ernest Mayet, Orvault, Loire (Atlantique), France, assignors to Societe Anonyme: Entreprise Bourdin & Chausse, Nantes-Saint-Joseph, Loire (Atlantique), France
Filed June 1, 1966, Ser. No. 554,377
Claims priority, application France, June 4, 1965, 19,574
Int. Cl. G01n 3/00
U.S. Cl. 73—78                                    6 Claims

ABSTRACT OF THE DISCLOSURE

A vehicle such as an earth roller gives an indication of the power torque which is required for propelling the vehicle over the surface on which it travels, as an inverse indication of the compaction of this surface. A correction factor for the inclination of the surface is also provided.

---

The present invention relates generally to a method and an apparatus for determining the load-bearing capacity and the deflection of soils or grounds, particularly their degree of compactness. This apparatus may be used for example when building roads, tracks, parking or other areas or like surfaces and is utilizable moreover on completed roads for ascertaining their load-bearing capacity or locating their imperfections.

Research work has led to the finding that the power torque which is necessary for propelling a compacting vehicle or any other craft varies with the degree of yield and slope of the ground on which said vehicle or craft is travelling.

The primary object of the invention is to provide a method and an apparatus for determining the load-bearing capacity and the deflection of various soils or grounds, said apparatus being adaptable to an automotive vehicle such as a ground-compacting craft of any suitable type or an implement mounted upon a frame or chassis towed by a tractor, the apparatus comprising means for directly or indirectly measuring the power torque which is necessary for propelling said vehicle or craft, means for indicating and for recording the result of the measure thus taken, and means for detecting the slope of the ground on which said vehicle or craft is travelling.

Another object of the invention is to provide a method and an apparatus as aforesaid applicable in a particularly useful fashion to a vehicle or craft propelled by one or several hydraulic motors. It is known that in such a craft the power torque applied to the road wheels varies with the service pressure of the pump that feeds the hydraulic motor or motors.

A further object of the invention is to provide an apparatus as aforesaid including pressure responsive means such as a gage or manometer connected to the high pressure circuit of the associated pump, and means associated with said gage or manometer for indicating and for recording the service pressure of the pump.

According to a feature of the invention, a manometer fitted to the high pressure circuit of the pump may be connected for example to the stylus or equivalent member that moves along a recording web to which adequate motion is imparted so as to register on said web those indications that are supplied by the manometer. Means are provided for imparting motion to the web at a speed in proper ratio to that of the vehicle or craft.

Yet another object of the invention is to provide an apparatus as aforesaid comprising a pendulum indicating the slope of the ground on which the vehicle or craft is moved. Such a pendulum may be connected with an indicating and/or recording device giving an indication of the slope gradient. Thus the pendulum may control the motion of a further stylus performing a registration on the same web as that which is used for recording the service pressure of the pump.

According to a conceivable modification, the pendulum may be connected with the primary recording stylus so as to achieve an automatic compensation of the traverse motion of the primary stylus in accordance with the gradient of the ground slope.

In each case, an examination of the indication as furnished or the record as performed permits the load-bearing capacity of the ground to be verified. It thus becomes particularly possible to determine in that way the time when adequate ground compacting is obtained. At this time the service pressure of the pump feeding the hydraulic motor or motors of the vehicle or craft or more generally the power torque being measured reaches a lower limit value which may be empirically calculated beforehand. The sudden variations of the indications as furnished or the recorded curve permit local weak points of the ground to be detected. A measure of the ground slope on which the vehicle or craft is travelling permits, owing to a comparison of various indications or curves or owing to the automatic compensation as achieved, the ensuing variation of the power torque resulting from said slope to be taken into account.

With these and such other objects in view as will incidentally appear hereafter, the invention comprises the novel construction and combination of parts that will be now described in detail with reference to the accompanying drawings exemplifying the same and forming a part of the present disclosure.

In the drawings:

FIGURE 4 is a diagrammatic elevational view drawn to a larger scale of the recording device.

Figure 3:
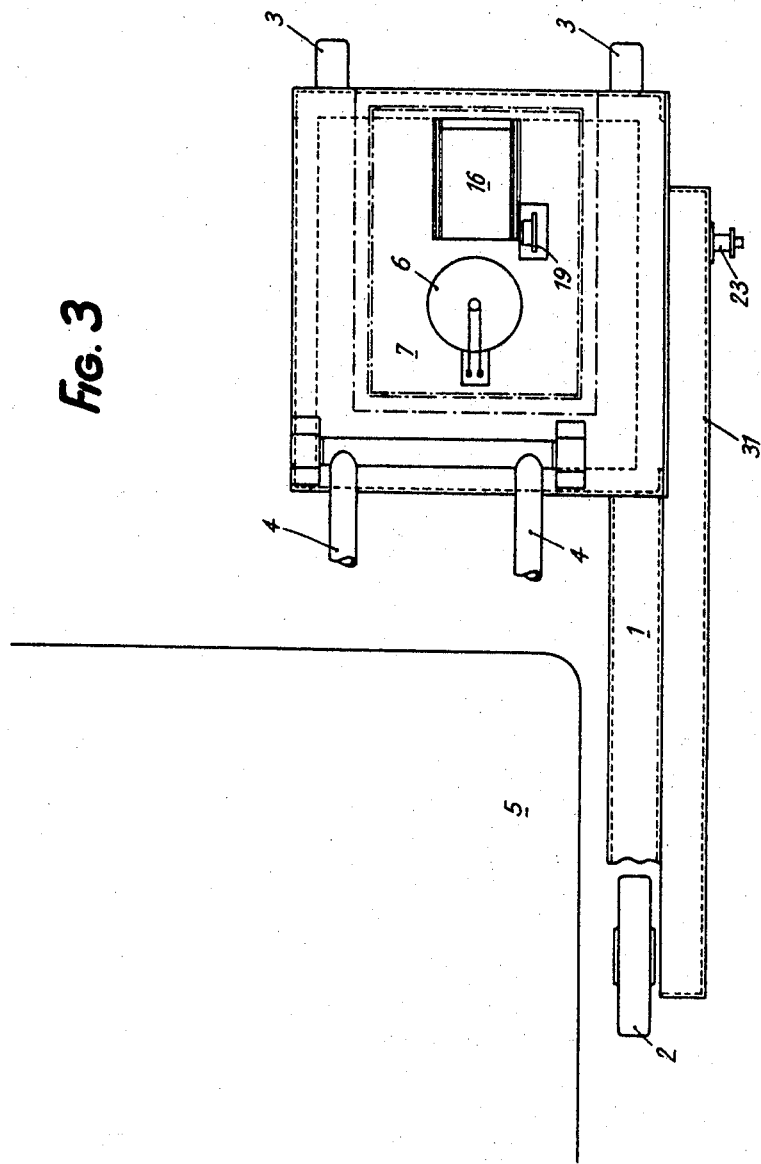
FIGURE 3 is a corresponding plan view.

As illustrated, the apparatus comprises an independent frame or chassis 1 which may be of the so-called welded box type so as to provide a sufficiently rigid and sturdy assembly to support the controlling and recording devices. This frame 1 is non-symmetrical as is clearly visible in FIG. 3 and comprises a non-steerable front wheel 2 and two steerable rear wheels 3. A coupling device diagrammatically shown at 4 in the showing of FIG. 3 permits hitching to be performed as shown at 5, for example rearwardly of a compacting craft or vehicle.

The apparatus as shown in the drawings comprises a pressure gage or manometer indicated generally at 6 which is connected by means (not shown) for example by flexible hoses with the high pressure outlet circuit of a pump fitted upon the craft 5 and adapted for example to feed hydraulic motors associated with the craft wheels so as to propel them. The manometer 6 is fitted upon the upper table 7 of the apparatus and is shielded as the other elements as hereinafter described by a protecting hood 8 having a transparent window 9 a portion of which may be swung up as shown diagrammatically in FIG. 1.

The manometer 6 has a stub shaft 10 (FIG. 4) carrying a gear 11 meshing with another gear 12 so as to move an arm 13 hinged to a holder 14 carrying a stylus 15 movable in contact with a recording web 16.

The web 16 is moved between a pair of rollers 17, 18 (FIG. 4) and is driven from a sprocket-wheel 19 (FIGS. 1 and 2) keyed to the shaft of the roller 17. Driving of the sprocket-wheel 19 is performed from the front wheel 2 of the apparatus through a gear 20 keyed to the axle of said front wheel, a sprocket chain 21, another sprocket wheel 22, a clutch 23, gears 24, 25, a speed reducer 26, a flexible coupling 27, a free wheel 28, a sprocket wheel 29 and a sprocket chain 30 engaged over said wheel 29. The sprocket chain drive 20–21–22 is housed in a side casing 31 of the apparatus. Another sprocket wheel 32 is provided for tightening the chain 21.

It will be seen from the foregoing that the recording web 16 is driven at a speed which is proportionate to the speed at which the vehicle or craft is travelling.

A pendulum designated generally by 34 permits the gradient of slope of the ground on which the vehicle travels to be measured. The pendulum 34 is immersed in a mass of oil indicated at 35 contained in a casing 36, and its supporting arm 37 is keyed upon the shaft of a pulley 39 (FIGS. 1 and 2) which is journalled in bearings 40, 41.

A cable 42 has its middle portion fixed to the pulley 39, for example at point 43 and can be wound up on this pulley. This cable passes over the jockey pulleys 44, 45, 46, 47 and is fastened at its respective ends to pulleys 48, 49 keyed to the same shaft 50 (as shown in FIG. 4) on which the ends of said cable 42 pass in opposite direction prior to being secured. It will be seen from an examination of FIG. 4 that the shaft 50 is journalled in a stationary part 51 of the apparatus so that its position remains at right angles to the table 7.

An arm 52 keyed to the shaft 50 is hinged to a bracket 53 which carries a second stylus 54 movable along the recording web 16.

The practice of the method and the operation of the apparatus may be briefly described as follows:

As hereinbefore set forth, the recording web 16 is moved, during the operation of the apparatus at a speed which is in direct ratio with the one at which the vehicle or craft is travelling. The coupling 23 permits said vehicle to travel without producing any record when the latter is not wanted.

During the motion of the craft, the stylus 15 controlled from the manometer 6 draws on the web 16 a curve which is indicative of the variation of service pressure furnished by the pump fitted upon the craft 5 which, as above stated, corresponds with the degree of compacting and load-bearing capacity of the ground.

Figure 1:
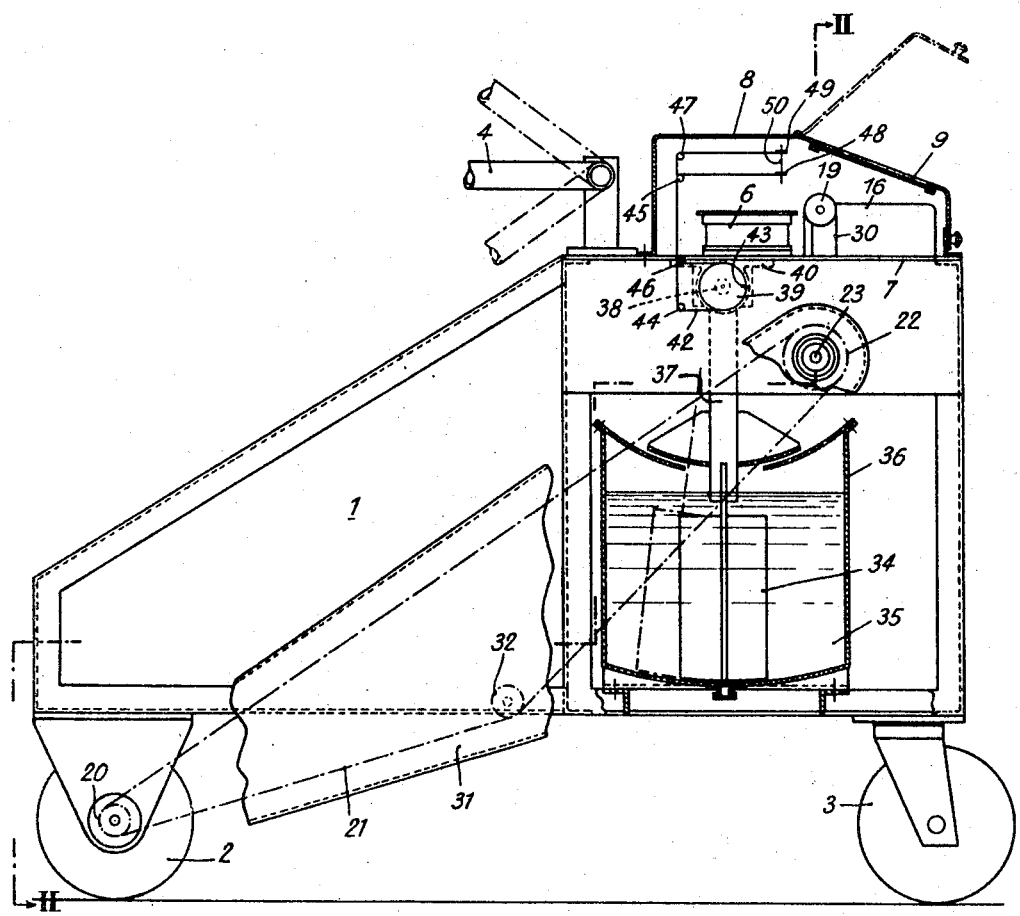
FIGURE 1 is a longitudinal sectional view on the line I—I of FIG. 2 of an apparatus according to the invention as applied to an independent frame or chassis.
Figure 2:
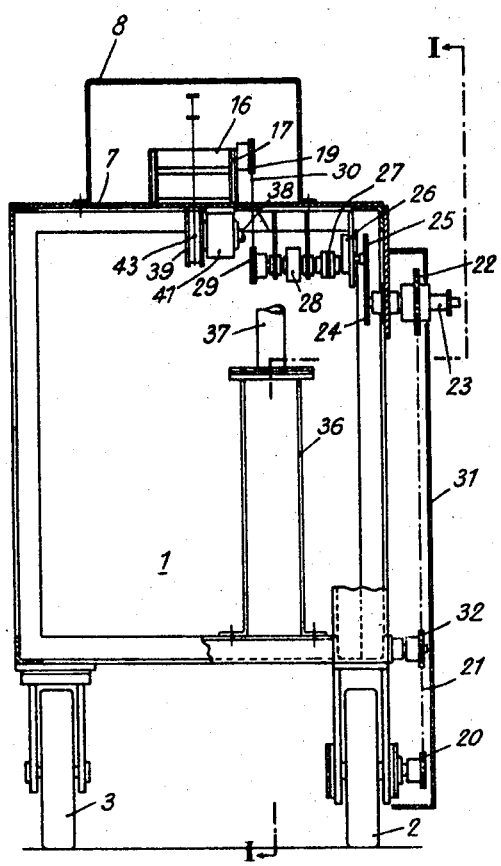
FIGURE 2 is a cross sectional view on the line II—II of FIG. 1.

When the ground on which the vehicle or craft travels is not on a level keel, the pendulum 34 which remains vertical slants with respect to the apparatus frame, for example as shown by the chain lines in FIG. 1. Motion of the pendulum 34 is damped by the oil in which it is immersed and is transmitted by the arm 37 to the shaft 38 and pulley 39. As the shaft 50 remains stationary with respect to the frame, the cable 42 imparts rotation to said shaft 50, thereby recording the gradient of slope on the web 16 by means of the stylus 54.

A simultaneous examination of the two curves drawn on the web 16 by the styluses 15 and 54 permits the operator to take into account, when appreciating the degree of compactness as actually obtained, the variation, in terms of the slope, of the power torque which is necessary for driving the craft.

As above stated, the shaft 50 might be operative upon the traverse of the arm 13 as controlled by the manometer so as to modify said traverse in terms of the gradient of slope so as to provide at each occurrence by a direct reading an indication of the actual degree of compacting.

Minor constructional details may be varied without departing from the scope of the subjoined claims.

What is claimed is:

1. A method for determining the compactness of the surface over which a vehicle travels, comprising continuously measuring the power torque which is required for propelling the vehicle over said surface, continuously measuring the slope of said surface simultaneously with the measurement of the power torque, and continuously displaying a visible correlation of said measured power torque and measured slope as an indication of said compactness.

2. A method as claimed in claim 1, in which said correlation is displayed on a recording web.

3. A method as claimed in claim 2, and forming the display said correlation at a linear rate which varies directly as the speed of the vehicle.

4. In a vehicle, means for determining the compactness of the surface over which the vehicle travels, said means comprising means for continuously indicating the power torque which is required for propelling said vehicle over said surface, means for continuously indicating the slope of said surface simultaneously with the indication of the power torque, means for continuously simultaneously recording said power torque and said slope, said recording means comprising a movable recording web on which said power torque and said slope are recorded, and means for moving said recording web at a speed proportional to the speed at which said vehicle is traveling.

5. Structure as claimed in claim 4, and hydraulic motor means for propelling said vehicle over said surface, pump means feeding said hydraulic motor means, and means responsive to the outlet pressure of said pump means for actuating said means for continuously indicating said power torque.

6. Structure as claimed in claim 4, said means for continuously indicating the slope of said surface comprising a pendulum carried by the vehicle, and means responsive to vertical swinging movement of said pendulum relative to the vehicle to actuate said recording means.

References Cited

UNITED STATES PATENTS

| | | | |
|---|---|---|---|
| 2,290,618 | 6/1942 | Bosomworth | 73—146 |
| 2,408,012 | 9/1946 | Williams | 73—78 |
| 2,690,668 | 10/1954 | Lucas | 73—146 |

RICHARD C. QUEISSER, *Primary Examiner.*

C. E. SNEE III, *Assistant Examiner.*

U.S. Cl. X.R.

73—84, 146